United States Patent [19]

O'Brien et al.

[11] Patent Number: 5,207,905
[45] Date of Patent: May 4, 1993

[54] BAFFLE ASSEMBLY FOR AIR AND WATER BACKWASH OF A MEDIA FILTER

[75] Inventors: Michael J. O'Brien, Basking Ridge; Eli Salem, Deal, both of N.J.

[73] Assignee: The Graver Company, Union, N.J.

[21] Appl. No.: 951,203

[22] Filed: Sep. 25, 1992

[51] Int. Cl.$^5$ .............................................. B01D 24/46
[52] U.S. Cl. ..................... 210/274; 210/275; 210/279; 210/269
[58] Field of Search ............... 210/274, 275, 794, 795, 210/793, 792, 279, 305, 807

[56] References Cited

U.S. PATENT DOCUMENTS

| | | | |
|---|---|---|---|
| 798,473 | 8/1905 | Wilson | 210/275 |
| 1,069,737 | 8/1913 | Stevenson | 210/794 |
| 2,453,345 | 11/1948 | Row et al. | 210/279 |
| 2,679,319 | 5/1954 | Walker | 210/275 |
| 2,888,140 | 5/1959 | Hebert | 210/275 |
| 3,286,842 | 11/1966 | DeJong | 210/275 |
| 3,313,420 | 4/1967 | Hirsch | 210/275 |
| 4,076,625 | 2/1978 | Scholten | 210/274 |
| 4,338,202 | 7/1982 | Louboutin | 210/795 |
| 4,479,880 | 10/1984 | Treanor | 210/275 |
| 5,154,824 | 10/1992 | Anderson | 210/794 |

Primary Examiner—Stanley S. Silverman
Assistant Examiner—Cynthia L. Nessler
Attorney, Agent, or Firm—Dressler, Goldsmith, Sutker & Milnamow, Ltd.

[57] ABSTRACT

A baffle system is described that significantly reduces media loss caused by turbulence encountered during gas and liquid backwashing of a discrete media filter bed. When positioned about a filter collection trough or outlet, the baffle system deflects rising gas bubbles away from the collection trough and disengages filter media from the backwash liquid.

7 Claims, 2 Drawing Sheets

BAFFLE ASSEMBLY FOR AIR AND WATER BACKWASH OF A MEDIA FILTER

TECHNICAL FIELD OF THE INVENTION

The invention relates to filtering apparatus, particularly filters which employ a bed of filter media that is backwashed by a turbulent stream.

BACKGROUND OF THE INVENTION

Filters containing discrete media are widely employed for the removal of suspended and colloidal impurities, such as organic matter, plankton, sewage, vegetable matter, colloidal silica, oil, and corrosion products from liquids, such as water. In some cases, coagulants are added to the liquid stream before filtration. The filters may include conventional single-material beds or multiple-material beds composed of sand, coal, or the like. The media may be, for example, spherical, or cylindrical.

During a filtration operation, the liquid to be filtered moves through the media under the influence of gravity, or, alternatively, the media may be enclosed in a pressure vessel and the liquid to be filtered is positively forced through the bed. Suspended matter is strained from the liquid stream and accumulates in voids between the solid particles of media producing a progressive increase in pressure across the bed. When the pressure drop reaches a predetermined limit, the filter is backwashed to discharge the accumulated material.

The media is backwashed by moving a liquid material, such as water, upward through the bed at rates that cause the filter bed to expand but not to fluidize completely. Additionally, a compressed gas, such as air, is often introduced into the bottom of the media bed to further agitate the bed and to break up crust and mud balls lodged in the bed. If introduced simultaneously with a backwashing liquid, the compressed air forms bubbles which rise through the expanded bed further increasing turbulence.

Turbulence caused by the upward velocity of the backwash liquid and by the motion of gas bubbles in the bed is desirable for dislodging dirt from the media, but tends to carry particles of the media up and into a collection outlet or trough where the particles are carried away and lost from the filter. Accordingly, relatively large freeboard water spaces are commonly provided over the volume of the expanded bed during backwashing to promote separation of filter media particulate from the dirt and the backwashing liquid.

In addition, baffles have been proposed, as described in U.S. Pat. No. 2,453,345 issued to Row et al. The baffles are said to reduce turbulence in the vicinity of a collection outlet, so that the media separates from the backwash stream and returns to the filter bed. The patent purports to teach a baffle system including a vertical baffle on each side of a collection trough. At lower corners of the collection trough, two more baffles are mounted which extend outwardly and downwardly to define gaps between the different types of baffles. However, separation efficiency of the system is reportedly hampered by eddy currents created by the interaction of the baffle system with rising air bubbles.

Another baffle system is described in U.S. Pat. No. 4,076,625 which issued to Scholten et al. The system includes one or more arcuate baffles positioned near a collection trough. The arcuate baffles purportedly divert unwanted eddy currents away from the collection trough and away from filter media which is being returned to the filter bed. Unfortunately, the purported teachings described by Scholten et al. appear to be limited to configurations which include but a single outflow channel. The system purportedly taught by Scholten et al. requires each of the returning media particles to pass countercurrently through the entire stream of rising backwash liquid.

Accordingly, there still exists a need for an improved baffle system. Preferably, such an improved baffle system would minimize the effects of unwanted eddy currents, provide for the unhindered return of media to the filter bed, and be of simple and straightforward construction that is adaptable to all types of discrete media filters.

SUMMARY OF THE INVENTION

The present invention is a baffle system for reducing carry-over of filter media into a water collection outlet or trough during gas and liquid backwashing of a filter media bed. The baffle system is surprisingly effective in creating a quiescent volume around the collection outlet or trough, and provides for the return of media to the filter bed through plural passages which are subject to relatively small superficial velocities of backwash liquid flow. The quiescent volume, including the passages, is substantially protected from agitation caused by rising gas bubbles.

In one aspect, the invention is a baffle system which comprises a pair of head baffles, one on either side of an elongated water collection trough of a filter. Backwash liquid which attains an elevation greater than a predetermined overflow level flows into the collection trough and is removed from the filter. The head baffles are generally planar and vertically disposed, having an upper edge which is at an elevation higher than the overflow level and a lower edge that is below the overflow level. Two wing baffles are angled toward each other to define a gap at a point below the collection trough. The wing baffles extend outwardly and upwardly from the gap to an upper edge which is located above the lower edges of the head baffles. Because the upper edges of the wing baffles are below the overflow level, liquid travels freely over the upper edges of the wing baffles and flows into the gaps between the head baffles and the wing baffles during a backwashing cycle. However, because the path which liquid must follow in travelling through the gap is generally downward, very few gas bubbles accompany the backwash liquid through the gap. A toe baffle is positioned below the gap between the wing baffles so as to shield the gap from gas bubbles ascending from a filter bed. The toe baffle is spaced sufficiently apart from the wing baffle to define two slots, each slot being located between the toe baffles and one of the wing baffles, and each slot being sufficiently wide to pass discrete filter media material particles downward toward the filter bed. The baffle system facilitates settling of entrained filter media in the vicinity of the collection trough and return of the filter media to a filter bed during gas and liquid backwashing.

In another aspect, the invention provides a baffle system for reducing carry-over of filter media that is suited for installation around a relatively compact collection outlet having a circular cross section. The apparatus comprises a generally cylindrical baffle with an axial bore which is positioned around the collection outlet so that an upper edge of the cylindrical baffle projects above the overflow level and a lower edge is situated below the overflow level. A conical baffle extends outwardly and upwardly from below the collection outlet past the lower edge of the cylindrical baffle, and terminates below the overflow level. An annular aperture is defined between the cylindrical baffle and the conical baffle. A circular shield baffle protects the lower end of the axial passage extending through the conical baffle. The shield baffle is positioned opposite the passage and defines a slot between the circular baffle and the conical baffle.

In yet another aspect, the invention is a baffle system for reducing carry-over of filter media that comprises a pair of planar upright baffles positioned on opposite sides of a collection trough having an overflow level. The upright baffles extend from above the overflow level substantially continuously to lower edges at an elevation below the overflow level. An upper skew baffle is oriented obliquely to one of the upright baffles so as to define a gap. The upper skew baffle extends upwardly, but not vertically, from a point below the collection trough. The upper skew baffle terminates in an upper edge which is located at an elevation intermediate between that of the overflow level and the lower edges of the upright baffles. A lower skew baffle is oriented obliquely to the upright baffles and to the upper skew baffle. The lower skew baffle approaches the other of the upright baffles so as to define a gap and extends upwardly from an elevation below the skew baffle to an upper edge which is located at an elevation intermediate between the overflow level and the lower edges of the upright baffles. The upright baffles and the upper and lower skew baffles operate together to create a relatively quiescent volume around the collection trough which promotes settling of filter media and the return of filter media to an associated filter bed but permits relatively smaller and less dense debris to remain entrained with a spent backwash liquid stream and exit the filter through the collection trough during a backwashing cycle.

DETAILED DESCRIPTION OF THE PREFERRED EMBODIMENTS

Figure 1:
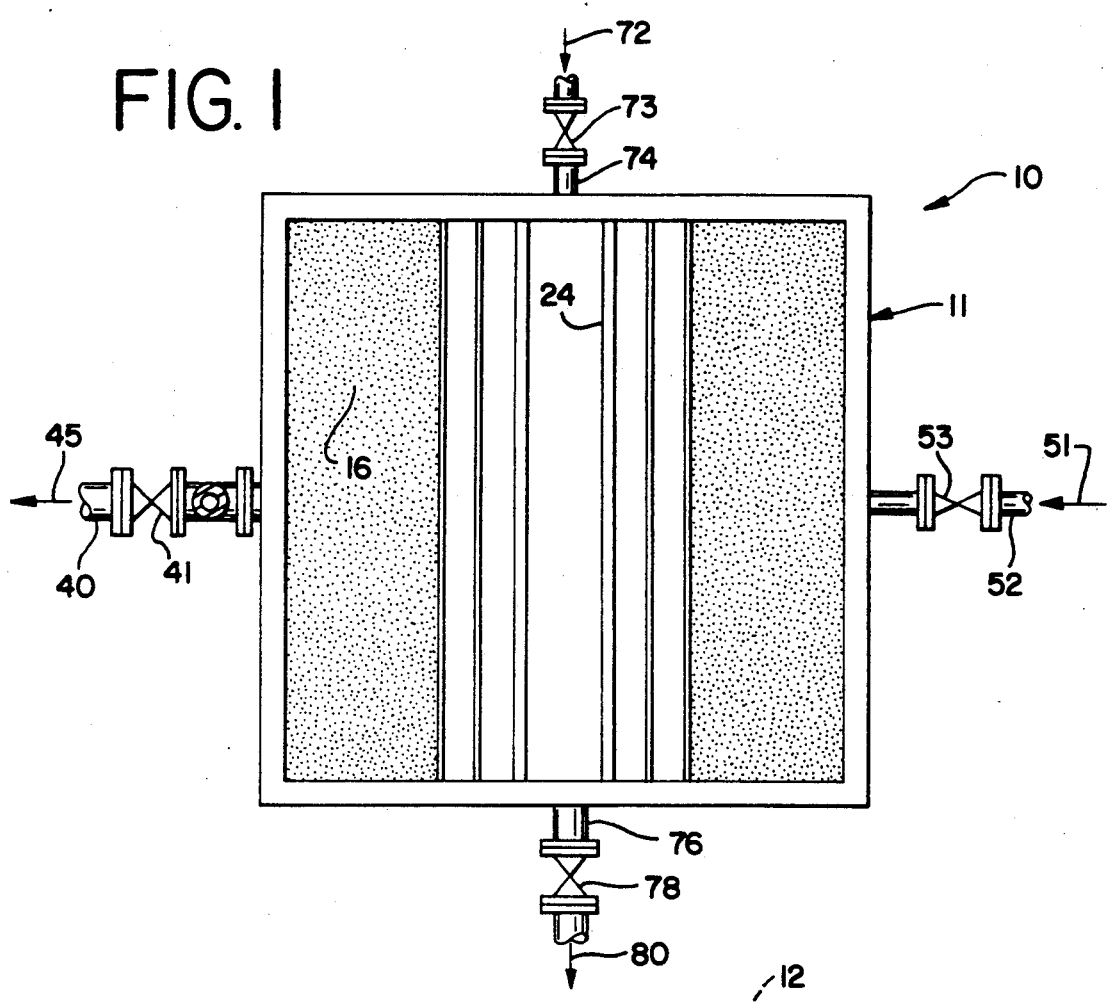
FIG. 1 is an overhead plan view of a rectangular gravity filter having a baffle system in accordance with the present invention.
Figure 2:
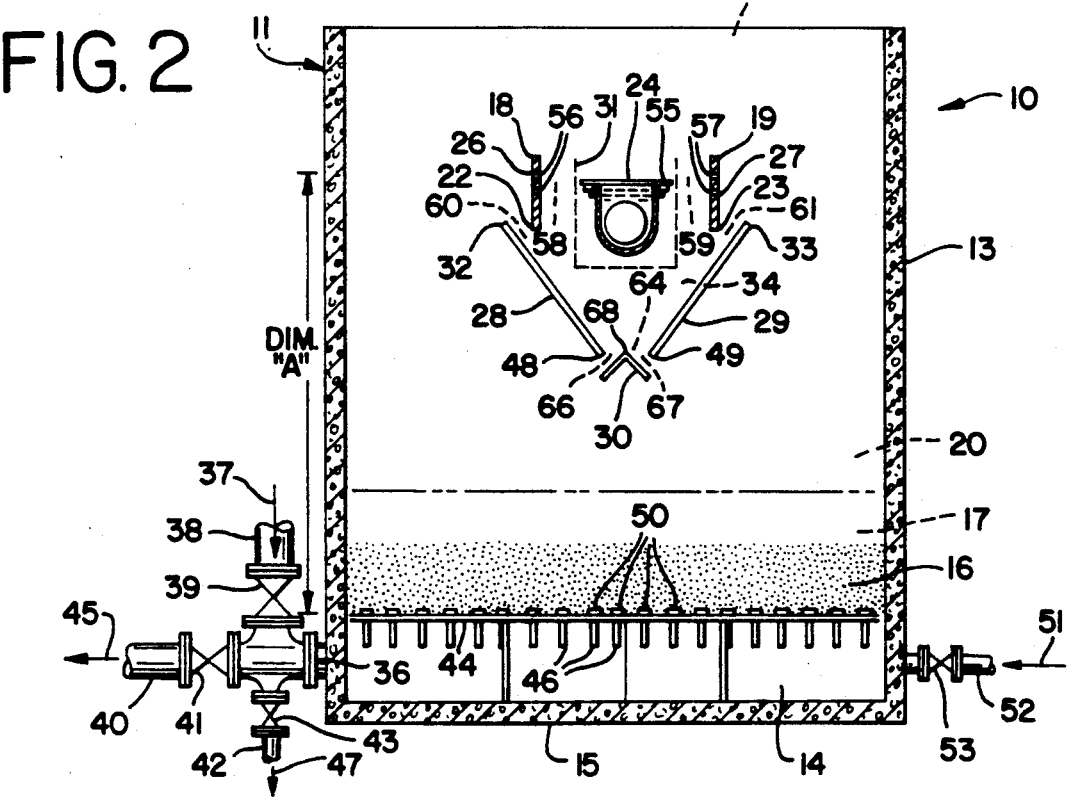
FIG. 2 is a cross-sectional view of the filter in FIG. 1 taken along plane 2—2.

FIG. 1 and FIG. 2 show a filter 10 in accordance with the present invention. The filter 10 is a gravity filter having a vessel 11 with an upper open end 12 communicating directly with the surrounding atmosphere. The sides 13 and bottom end 15 of the vessel 11 are sealed to liquid flow. The vessel 11 contains a plenum chamber 14, a media filter bed 16 containing discrete particles, an expansion volume 17 to accommodate expansion of the bed 16 during a backwashing operation, and a freeboard space 20 above the expansion volume 17. In the freeboard space 20, a collection trough 24 collects a spent backwash liquid stream 80, during the backwashing cycle, and also serves as an inlet distributor for an unfiltered liquid stream 72 during the filtration cycle. A system of baffles (26–30) is arranged about the collection trough 24 to provide a relatively quiescent volume 34 for settling filter media from a bulk flow of backwash liquid during the backwashing cycle. The vessel 11 is equipped with a header 36 that provides flow communication between the plenum chamber 14 and a backwash conduit 38, a filtered water outlet conduit 40, and optionally a drain conduit 42. Each of the conduits is equipped with a dedicated valve (39, 41, 43, respectively) which regulates liquid flow.

The bed 16 of filter media is supported by an underdrain plate 44 which also serves to divide the bed 16 of the vessel 11 from the plenum chamber 14. A plurality of nozzles 46 pass through apertures in the underdrain plate 44 and are capped with strainers 50 sized to prevent the media from passing downward to the nozzles 46. A gas inlet conduit 52 equipped with a flow regulating valve 54, communicates with the plenum chamber 14 to inject a gas, preferably compressed air, which is useful for agitating the media bed 16 during a backwashing cycle.

The filter media bed 16 is composed of particles of conventional materials, such as sand, coal, clay, and charcoal. Alternatively, the particles may be, for example, spheres composed of a co-polymer or cylinder formed by pelletizing a ceramic. The bed 16 may contain more than one material, and the particles need not be of uniform size. Optionally, the bed 16 may contain two or more distinct layers having particles of different density and size distribution. The particles are hydraulically classified by an upflow movement of the backwashing liquid during the backwashing cycle.

The collection trough 24 is located at a predetermined elevation (Dimension 'A') above the underdrain plate 44. More specifically, a damn or weir 55 over which backwash liquid must travel to enter the collection trough 24 determines the overflow level. The elevation of the overflow level is calculated to provide a sufficient bed expansion volume 17 and freeboard space 20. During the backwashing cycle, the vessel 11 will be filled with backwash liquid to an elevation equal to or slightly above the overflow level.

One head baffle (26 or 27) is located on either side of the collection trough. The head baffles (26 and 27) have upper edges (18 and 19) positioned at a higher elevation than the overflow level so that the upper edges (18 and 19) project over the surface of the backwashing liquid during the backwashing cycle and block migration of full-sized media particles horizontally along the surface to the collection trough 24. Particles at the surface must necessarily descend to pass beneath a lower edge (22 or 23) of the head baffle (26 or 27) and then rise vertically to clear the weir 55 of the collection trough 24, if they are to exit the filter 10. The head baffles (26 and 27) are positioned a sufficient distance from the weir 55 to produce relatively low vertical backwash liquid velocities in the region 58 between the head baffles and the collection trough 24 which permit settling of full-sized media particles. In contrast, debris washed from the bed remains entrained and is removed from the filter with the backwash liquid.

The head baffles (26 and 27) project above the overflow level a sufficient distance to prevent splashing liquid from crossing over their upper edges (18 and 19).

The head baffles (26 and 27) project below the overflow level to provide a residence time that permits settling rates to approach equilibrium. Preferably, the head baffles (26 and 27) are disposed approximately vertically and are positioned generally parallel to a longitudinal axis of the collection trough 24.

Optionally, the head baffles (26 and 27) may define a plurality of perforations (56 and 57) at approximately the elevation of the overflow level which permit relatively small floating particles of debris to pass along the surface of the backwash liquid to the collection trough 24. Two or more sets of perforated head baffles may be utilized simultaneously, as required, to enhance settling of whole media particles in the region 58 between the collection trough 24 and the head baffles (26 and 27). On the other hand, a system having a single set of head baffles is relatively less expensive, and is preferred in many applications.

To further communicate how the head baffles (26 and 27) with perforations, such as the perforations (56 and 57), are configured, one specific baffle system including a particular type of perforated baffle is now described. However, this description is not meant to limit the scope of the invention in any way. The specific baffle system consists of two sets of parallel vertical baffles, corresponding to the head baffles (26 and 27), which were spaced approximately one inch apart on each side of a trough, corresponding to the collection trough 24. Each of the particular baffles has one and one-half inch diameter holes, corresponding to the perforations (56 and 57), located on four and one-half inch centers at an anticipated backwash water level. The particular baffles are arranged so that the holes do not overlap. The specific baffle system was tested and was found to provide a path for floating debris to work its way to the trough while impeding carry-over of air-born media.

Two wing baffles (28 and 29) are positioned generally below the head baffles, but have upper edges (32 and 33) which extend to an elevation higher than that of the lower edges (22 and 23) of the head baffles (26 and 27). Accordingly, backwash liquid which travels beneath the head baffles (26 and 27) is diverted downward as it passes through a gap (60 and 61) between the head baffle and the wing baffle. Because gas bubbles in the backwash liquid tend to rise, this downward diversion of the backwash liquid separates substantially all gas bubbles from the backwash liquid. In this manner, any carry-over of full-sized media particles which might be promoted by the presence of bubbles is avoided. The gap (60 or 61) is calculated to have a cross-sectional area for backwash liquid flow that does not produce relatively high local liquid velocities in the settling regions (58 and 59).

The wing baffles (28 and 29) are inclined to the vertical, extending upwardly and outwardly to a width greater than the spacing between the head baffles (26 and 27). The wing baffles (28 and 29) deflect rising bubbles away from the collection trough 24 to a distance where any currents created by the rising gas bubbles produce no more than an insignificant effect on the settling regions (58 and 59) within the head baffles (26 and 28). Further, because the wing baffles (28 and 29) are inclined, solid particles separated from the backwash liquid in the settling regions (58 and 59) or in the gaps (60 and 61) tend to slide down along the inner surfaces of the wing baffles and return to the bed 16 through an opening 64 between the wing baffles.

Directly opposite and substantially below the opening 64 is a toe baffle 30 which extends across and shields the opening 64. The toe baffle 30 preferably divides the opening 64 into two elongated slots (66 and 67), each sufficiently large to pass a portion of the particles returning to the media filter bed 16. Preferably, the slots (66 and 67) are wide enough to simultaneously pass an appreciable volume of backwash liquid at relatively low velocities countercurrent to the returning particles, without disturbing the relative calm of the quiescent volume 34 within the baffles (26–30) or hindering the return of the particles.

It is especially preferred that the toe baffle 30 define an apex 68 which projects toward the collection trough 24. As surfaces of the toe baffle 30 extend downwardly and outwardly from the apex 68, they facilitate return of the whole particles to the bed 16.

Optionally, in applications which require very high retention of the filter media in the filter 10, a disengaging screen 31 may be positioned substantially around the collection trough 24 within the quiescent volume 34 formed by the head baffles (26 and 27), the wing baffles (28 and 29), and the toe baffle 30. In most cases, the disengaging screen 31 need not include apertures small enough to provide a sieving action. Instead, the disengaging screen 31 is often employed primarily as a site for collisions which deflect full-sized media particles away from the collection trough 24. One of the advantages of having a disengaging screen 31 with relatively larger apertures is that the larger apertures resist plugging and do not significantly impede removal of floating material from the filter 10. It should be understood, however, that the baffle system of the present invention can be highly efficient without the optional disengagement screen 31.

The normal operation of the filter 10 is divided into filtration, backwashing, and rinsing cycles. Referring again to FIG. 1 and FIG. 2, an unfiltered liquid stream 72, such as water containing suspended or colloidal contaminants, enters the filter 10 through an inlet conduit 74. The unfiltered liquid stream 72 passes through a valve 75 and overflows the collection trough 24, which is generally submerged during service and serves as an inlet distributor during the filtration cycle. The unfiltered liquid stream 72 travels down through the baffles (26–30) to the media filter bed 16. Hydraulic resistance presented by the bed 16 causes the stream 72 to spread and distribute relatively uniformly across the surface of the bed 16 before progressing further downward. As the stream passes through the bed, suspended or colloidal particles are strained from the liquid and retained within the bed 16. Upon reaching the underdrain plate 44, the liquid constitutes a filtered stream 45 which passes through the nozzles 50, into the plenum chamber 14, and out to storage or further processing through the valve 41.

Eventually, the bed 16 becomes loaded with debris which has been removed from the unfiltered liquid stream 72. In practice, the degree of bed loading can be inferred by observing a pressure drop across the bed 16. When the pressure drop reaches a predetermined level, the flow of the unfiltered liquid stream 72 is interrupted, the filtered liquid outlet valve 41 is closed, the liquid level in the filter 10 is drained down via valve 78, and the backwash cycle begins.

A backwash liquid stream 37, which is usually a portion of the filtered stream 45 that has been retained for this purpose, enters the plenum chamber 14 through the backwash valve 39. Optionally, a compressed backwash gas stream 51, which is preferably air, enters the plenum chamber 14 through the gas valve 53 and mixes with the backwash liquid stream 37. The nozzles 46 distribute the backwash liquid stream 37 and the backwash gas stream 51 along the cross section of the filter 10. The backwash liquid and the backwash gas may be introduced to the filter 10 either sequentially or simultaneously, depending on the nature of a particular filtration application.

In terms of filter media carry-over, the most severe conditions usually occur when backwash liquid and backwash gas are utilized simultaneously. In that case, a combined stream of backwash material passes through the nozzles 46 and enters the bed as two-phase flow. The bed 16 is expanded and agitated by the upward passage of the backwash material. Typically, the bed 16 will expand to a volume that is approximately 150% of its filtration operation volume, and is turbulently agitated by the passage of backwash liquid and gas bubbles. The agitation promotes release of solid debris from the media particles. The debris is entrained and carried along with the backwash material toward the collection trough 24 for removal from the filter 10.

The flow rates of the backwash liquid and backwash gas streams (37 and 51) are controlled so that the full-sized media particles do not become completely fluidized, and remain chiefly below a predictable elevation. However, localized variations in liquid and gas velocities, as well as interficial phenomena which cause solids to be drawn to or to follow rising gas bubbles, cause some of the full-sized media particles to leave the expanded bed volume 17 and travel up toward the collection trough 24. During a simultaneous air and water backwash of a typical media bed, the media storms about under the influence of a combined backwash stream. A significant portion of the media particles would likely exit the filter 10 and be lost, if the baffle system (26-30) of the present invention were not employed.

Rising gas bubbles are deflected outwardly and away from the collecting trough 24 by the toe baffle 30 and by the wing baffles (28 and 29). There is little opportunity for the bubbles to enter the quiescent volume 34 formed by the baffles (26-30), because to do so would require downward travel which the gas bubbles resist as a consequence of their buoyancy. Approximately at the overflow level, the gas bubbles separate from the backwash material, producing a spent liquid stream 80, and pass through the open end 12 of the filter 10 to the surrounding atmosphere. The spent liquid stream 80 exits the filter 10 via the collection trough 24, a spent liquid conduit 76, and a valve 78.

As the gas bubbles leave the surface of the spent liquid stream 80, they become separated from debris and media particles which had been attached to or were drawn along by the rising bubbles. The debris and particles are prevented by the head baffles (26 and 27) from migrating horizontally to the collection trough 24. Relatively smaller particles of debris are entrained within the spent liquid stream 80 as it negotiates the gaps (60 and 61) or the slots (66 and 67) and moves toward the collection trough 24. Floating debris can also pass through the small apertures which are optionally provided through the head baffles (26 and 27) at the overflow level. Altogether, most full-sized media particles are turned back by the baffles (26-30) or are settled in the quiescent volume 34 and returned to the bed 16 via the slots (66 and 67) adjacent the toe baffle 30. The backwashing operation ends when both the backwash liquid valve 37 and the backwash gas valve 53 are closed, stopping the flow of backwash liquid to the filter. The bed 16 of filter media subsequently collapses back to its previous, compact state.

The final stage of normal filter operation is a rinsing cycle in which a remaining portion of the backwash material is removed from the filter 10. The unfiltered liquid stream 72 is again routed to the filter 10 and causes backwash material to be withdrawn through the header 36 to the filtered stream 45 via the filtered liquid outlet valve 40 or, alternatively, to disposal 47 through the drain conduit 43 and valve 42.

Gravity filters are especially useful when constructed as large units. They may be round, but preferably are square or rectangular in cross-section. Large rectangular gravity filters can be placed conveniently close together to minimize plot plan area requirements. The large rectangular units commonly have concrete vessels and typically range from about 5 to about 15 feet in height. They are often installed partially below ground to minimize construction costs. Conversely, pressure filters are usually constructed within cylindrical or spherical vessels to reduce the volume and cost of the vessel or to avoid the necessity of an additional pumping station for the filtered stream. The present invention is equally applicably to gravity filters and pressure filters.

Figure 3:
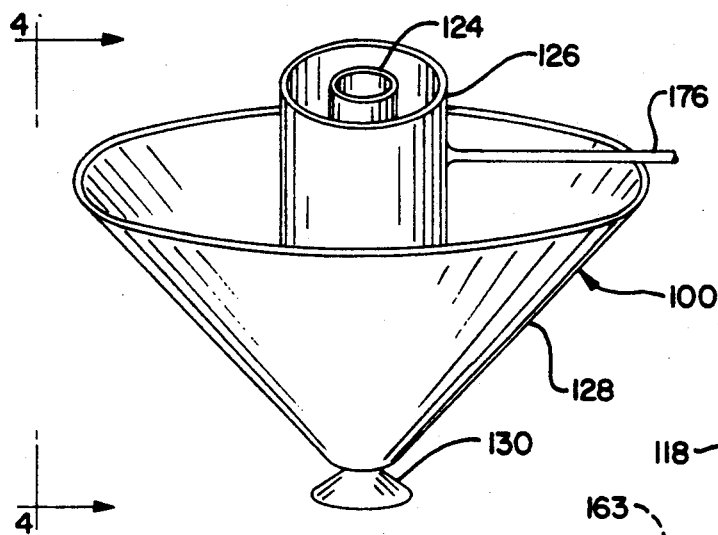
FIG. 3 is a perspective view of a circular baffle system in accordance with an alternative embodiment of the present invention.
Figure 4:
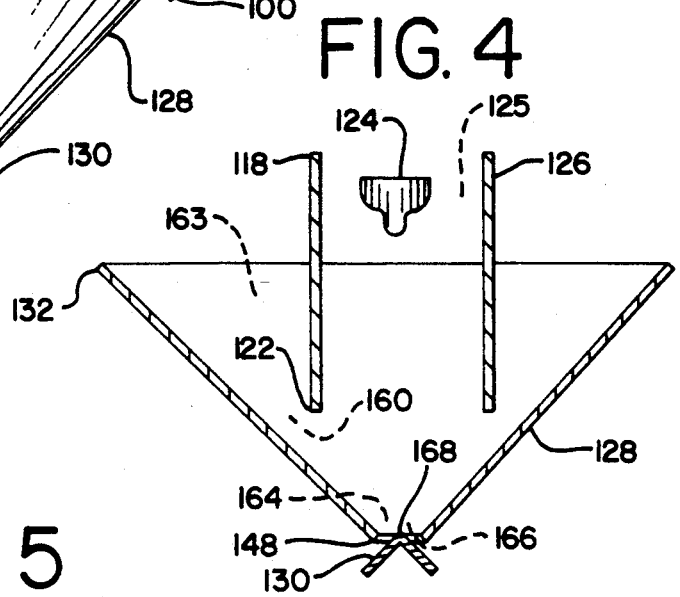
FIG. 4 is a cross-sectional view of the baffle system of FIG. 3 taken along plane 4—4.

FIG. 3 and FIG. 4 show a perspective view of a baffle system 100 in accordance with an alternative embodiment of the present invention that is suited for use with a compact collection outlet 124, as is commonly employed in pressure filters. Elements which perform similar functions to those of elements shown in FIGS. 1 and 2 are designated in FIGS. 3 and 4 by element numbers having the same last two digits as the elements depicted in FIGS. 1 and 2. For example, collection outlet 124 performs a function similar to that of collection trough 24.

The baffle system 100 comprises a cylindrical baffle 126 having a longitudinal axis disposed approximately vertically. An axial bore 125, defined by the cylindrical baffle 126, extends completely through the cylindrical baffle 126. The collection outlet 124 is positioned within the axial bore 125, so that the collection outlet 124 is encircled by the cylindrical baffle 126. A spent liquid outlet conduit 176 conducts liquid collected by the collection outlet 124 through a channel defined by the cylindrical baffle 126 and out of an associated filter (not shown).

The collection outlet 124 has a determinable overflow level at which spent backwash liquid will flow into the collection outlet 124 and exit the filter. An upper edge 118 of the cylindrical baffle 126 is higher than the overflow level, while a lower edge 122 of the cylindrical baffle 126 is located beneath the overflow level and is submerged while the filter is in backwashing cycle. Optionally, the cylindrical baffle 126 defines perforations 156 approximately at the elevation of the overflow level which are sized to pass floating debris but to obstruct relatively larger media particles.

A conical baffle 128 is positioned so that an upper edge 132 of the conical baffle 128 is below the overflow level and above the lower edge 122 of the cylindrical baffle 126. The conical baffle 128 defines an axial passage 163 which extends completely through the conical baffle 128, terminating in a circular opening 164. The conical baffle extends upwardly and outwardly from the opening 164 to the upper edge 132. The cylindrical baffle 126 and the conical baffle 129 are spaced apart to define an annular aperture 160 between the two baffles (126 and 128).

A shield baffle 130, preferably having an apex 168 which extends toward the cylindrical baffle 126, is positioned opposite and, preferably, extends partially into the axial passage 163 of the conical baffle 128. The operation of the associated filter, preferably a pressure filter, equipped, with the baffle system 100 is substantially the same as described with reference to the filter 10.

Figure 5:
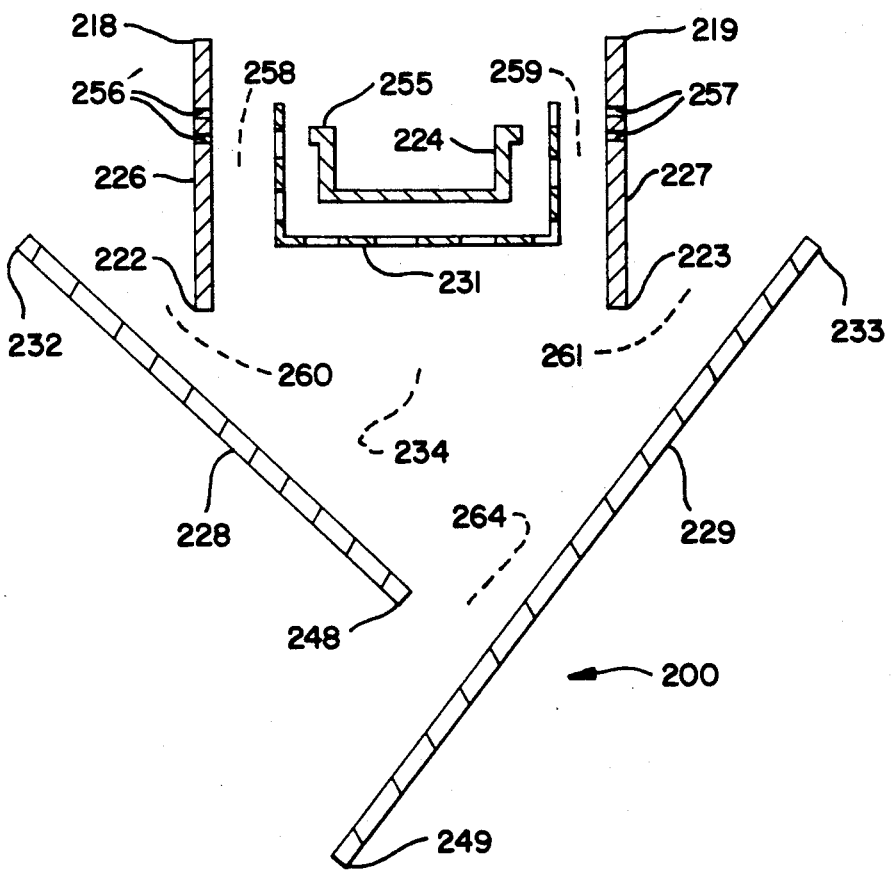
FIG. 5 is a cross-sectional view of an asymmetrical baffle system in accordance with another alternative embodiment of the present invention.

In another alternative embodiment in accordance with the present invention, a baffle system comprises a pair of upright baffles (226 and 227), as shown in FIG. 5. Elements in FIG. 5 which are analogous to those depicted in FIG. 1 are assigned element numbers which are two hundred units higher than those of FIG. 1. For example, the upright baffle 226 performs a function which is similar to that of the head baffle 26 shown in FIG. 1.

The upright baffles (226 and 227) are vertically disposed on opposite sides of a collection trough 224 which serves to deliver unfiltered liquid to and collect spent backwash liquid from an associated filter (not shown). The upright baffles (226 and 227) are substantially continuous so as to be capable of dampening unwanted eddy currents and restraining splashing liquid. However, the upright baffles (226 and 227) may contain a plurality of small perforations (256 and 257) located at about the elevation of an overflow level defined by a weir 255 of the collection trough 224. The upright baffles (226 and 227) define upper edges (218 and 219) which are located above the overflow level and lower edges (222 and 223) which are below the overflow level.

An upper skew baffle 228, generally planar and inclined at an angle to the vertical, defines an upper edge 232 and a lower edge 248. The upper skew baffle 228 is, preferably, continuous between the edges it defines (232 and 248). The upper skew baffle 228 approaches but does not contact one of the upright baffles 226, defining a gap 260 between the upright baffle 226 and the upper skew baffle 228.

Because the upper edge 232 of the skew baffle 228 is located above the lower edge 222 of the upright baffle 226 and is below the overflow level defined by the weir 255, spent backwash liquid passes over the upper edge 232 and travels downwardly through the gap 260. As described above with reference to the filter 10, the gap 260 is sized to produce downward velocities that tend to disengage gas bubbles from the spent backwash liquid as it passes through the gap 260, while permitting unwanted debris to continue through the gap 260 with the spent backwash liquid for removal.

A lower skew baffle 229 is oriented obliquely to both the upright baffles 226 and 227 and to the upper skew baffle 228. The lower skew baffle 229 is spaced from the other of the upright baffles 227, and defines a gap 261 therebetween. Preferably, the lower of the skew baffles 229 extends continuously from an upper edge 233 to a lower edge 249. The upper and lower skew baffles (228 and 229) define an opening 264 therebetween. More specifically, the lower end 248 of the upper skew baffle 228 extends toward but does not contact the lower skew baffle 229. The opening 264 lies directly over the lower skew baffle 229 and is preferably positioned a distance away from the lower edge 249 of the lower skew baffle 229. The opening 264 is sheltered from gas bubbles which may rise vertically from the lower edge 249, much as the toe baffle 30 shelters the opening 64 of the baffle system depicted in FIG. 1.

A relatively quiescent region is located generally between the upright baffles (226 and 227) and the upper and lower skew baffles (228 and 229). As described above, the gaps (260 and 261) and the opening (264) are sized so that spent backwash liquid with substantially no bubbles may enter the relatively quiescent region 234 carrying entrained debris, at the same time that whole particles of filter media are passing downwardly through the opening 264 to rejoin a filter bed (not shown). Similarly, the spacing between each of the upright baffles (226 and 227) and the outlet trough 224 is calculated to provide velocities suitable for settling of whole particles of filter media in the settling regions (258 and 259) located between the upright baffles (226 and 227) and the collection trough 224. A disengagement screen 231 may optionally be positioned around the collection trough 224 in the quiescent zone 234. The operation of the baffle system is substantially similar to that described above in reference to the filter 10.

Although three preferred embodiments of the present invention have been described to better communicate the invention, the invention is not limited to the particular embodiments described. The invention includes other embodiments which will readily become apparent to those who study these teachings. The invention is intended to be as broad as the claims will allow.

What is claimed is:

1. In a filter including a filter vessel, a media filter bed supported in said filter vessel, a collection trough having an overflow level positioned in said vessel, inlet means for passing an unfiltered liquid stream downwardly through said bed, and backwashing means for passing backwash gas and backwash liquid upwardly through said bed, a baffle system comprising:

a pair of generally planar head baffles disposed on opposite sides of said collection trough having said overflow level, each of said head baffles extending downwardly from above said overflow level and defining a lower edge located below said overflow level;

a pair of spaced apart wing baffles defining an opening therebetween, each of said wing baffles being substantially aligned with and distanced from said head baffles so as to define a gap, each of said wing baffles extending outwardly and upwardly from below said collection trough so as to define an upper edge which is located above said lower edges of said head baffles and below said overflow level; and a toe baffle positioned across and substantially below said opening between said wing baffles, said toe baffles being spaced from said wing baffles so as to define two slots, each of said slots being located between said toe baffle and one of said wing baffles;

whereby said head baffles, said wing baffles, and said toe baffle shelter a relatively quiescent volume in the vicinity of said collection trough which promotes settling of entrained filter media and return of the filter media to said media filter bed during gas and liquid backwashing.

2. The baffle system of claim 1 wherein each of said head baffles defines a perforation at approximately the elevation of said overflow level.

3. The baffle system of claim 1 wherein a disengagement screen is positioned between said collecting trough and said head baffles, said disengagement screen substantially surrounding said collecting trough.

4. The baffle system of claim 1 wherein said head baffles ar disposed vertically.

5. The baffle system of claim 1 wherein said toe baffle defines an apex projecting toward said collecting trough.

6. In a filter including a filter vessel, a media filter bed supported on said filter vessel, a collection outlet having an overflow level positioned in said vessel, inlet means for passing an unfiltered liquid stream downwardly through said bed, and backwashing means for passing backwash gas and backwash liquid upwardly through said bed, a baffle system comprising:
- a cylindrical baffle disposed about said collection outlet having said overflow level, said cylindrical baffle defining an axial bore therethrough and extending downwardly from above said overflow level and defining a lower edge located below said overflow level;
- a conical baffle defining an axial passage therethrough and extending outwardly and upwardly from below said collection outlet to define an upper edge which is located above the lower edge of said cylindrical baffle and below said overflow level, said conical baffle approximately aligned and distanced from said cylindrical baffle so as to define an annular aperture therebetween; and
- a shield baffle positioned opposite the bore through said conical baffle, and spaced apart from said conical baffle so as to define a slot between said shield baffle and said conical baffle;
- whereby said cylindrical baffle, said conical baffle, and said shield baffle shelter a relatively quiescent volume in the vicinity of said collection outlet which promotes settling of entrained filter media and return of the filter media to said media filter bed during air and liquid backwashing.

7. In a filter including a filter vessel, a media filter bed supported in said filter vessel, a collection trough having an overflow level positioned in said vessel, inlet means for passing an unfiltered liquid stream downwardly through said bed, and backwashing means for passing backwash gas and backwash liquid upwardly through said bed, a baffle system comprising:
- a pair of generally planar upright baffles disposed on opposite sides of said collection trough having said overflow level, each of said upright baffles extending downwardly from above said overflow level and defining a lower edge located below said overflow level;
- a generally planar upper skew baffle substantially aligned with and distanced from one of said upright baffles so as to define a gap therebetween, said upper skew baffle extending upwardly at an angle inclined to the vertical from below said collection trough so as to define an upper edge which is located above said lower edges of said upright baffles and below said overflow level; and
- a generally planar lower skew baffle substantially aligned with and distanced from the other of said upright baffles so as to define a gap therebetween, said lower skew baffle extending upwardly from below said upper skew baffle to define an upper edge which is located above said lower edges of said upright baffles and below said overflow level, said lower skew baffle being spaced apart from and oriented obliquely to the upper skew baffle so as to define an opening therebetween which is located directly over the lower skew baffle;
- whereby said upright baffles, said upper skew baffle, and said lower skew baffle shelter a relatively quiescent volume in the vicinity of said collection trough which promotes settling of entrained filter media and return of the filter media to said media filter bed during gas and liquid backwashing.

* * * * *